Patented Oct. 19, 1948

2,451,686

UNITED STATES PATENT OFFICE 2,451,686

STARCH COMPOSITIONS CAPABLE OF FORMING WATER-SOLUBLE DERIVATIVES

Fredrik André Möller, Haren, near Groningen, and Jan Lolkema, Hoogezand, Netherlands, assignors to Naamlooze Vennootschap: W. A. Scholten's Chemische Fabrieken, Groningen, Netherlands, a corporation of the Netherlands No Drawing. Application March 28, 1946, Serial No. 657,898. In the Netherlands April 25, 1941

5 Claims. (Cl. 252—188.3)

Patent application No. 380,562 relates to a process of manufacturing dry products soluble in cold and/or hot water from carbohydrates that will swell or dissolve in hot water and may be stirred with a little water to form a solution, a paste or a suspension. This process consists in subjecting a mixture of the carbohydrate with an etherifying and/or an esterifying agent and contingently an alkaline substance to the cold swelling starch process. The term "cold swelling starch process" is used to indicate a treatment consisting in suddenly heating the carbohydrate mixed with a limited proportion of water for a short time at a high temperature, for gelatinizable carbohydrates preferably at a temperature above the gelatinizing point, the mass being pressed into a thin layer which is dried at the same time or immediately thereafter. The products obtained according to this process consist entirely or for the greater part of ethers, esters or mixed ether-esters of the carbohydrates.

The present invention has for its purpose the manufacture of dry starch products soluble in cold water which substantially do not yet contain ethers or esters of starch, the solutions of which, however, will produce starch ethers or esters, which are soluble in cold and/or warm water, particularly when subjected to moderate heating. This process consists in mixing cold swelling starch, an etherifying and/or an esterifying agent and the proportion of alkali necessary or desirable for effecting etherification or esterification in the absence of substantial quantities of water.

For the manufacture of the products according to the invention etherifying and/or esterifying agents of various kinds may be used.

The best known and most frequently used etherifying agents are the esters of alcohols, e. g. with acids such as sulphuric acid. During etherification with substances of this kind the acid will be liberated entirely or in part, and it will therefore be necessary in general when employing the same, to add substances with an alkaline reaction which will neutralise the said acids and/or will convert the starch into the more reactive alkali starch. It is also possible, however, to use etherifying agents that do not produce acid and are capable of etherifying, e. g. of cold swelling starch without any further addition. Nevertheless it is generally advantageous in this case too to add alkaline substances, as they will catalytically promote the reaction.

As esterifying agents we may employ e. g. the chlorides of the organic acids. In this case alkali is likewise added in order to neutralise the hydrochloric acid formed during reaction.

We may also add to the cold swelling starch more than one etherifying agent or esterifying agent or combinations of etherifying and esterifying agents.

The process in its simplest form may be carried out by mixing cold swelling starch, the etherifying and/or the esterifying agent and contingently the alkali in the absence of a substantial proportion of water. Under these conditions there is practically no question of any etherification or esterification of the cold swelling starch, so that the components remain in the mixture in unchanged condition. If the mixture, however, is dissolved in water, etherification or esterification will proceed, particularly if the solution is heated and solutions will be produced, in which the cold swelling starch is entirely or partially etherified or esterified, while etherification and/or esterification will be completed during the practical application of the said solutions, which generally involves a drying process.

It is also possible, however, to manufacture the starch products according to the invention in the form of two separate preparations one of which contains the etherifying agent and/or the esterifying agent, while the other contains the quantity of alkali necessary for effecting etherification and/or esterification, e. g. soda in a dry condition. They are obtained by mixing the cold swelling starch with the etherifying or the esterifying agent, or with the dry alkali. In order to prepare the desired solutions it will only be necessary to dissolve the two starch products in the desired ratio in water.

In this embodiment of the invention it is possible to obtain the first preparation, if desired, by adding the etherifying and/or the esterifying agent before or during the cold swelling starch process. During the heating which forms part of the cold swelling starch process, to which the mixture of starch, water and an etherifying and/or an esterifying agent which will split off acid during the reaction is subjected there will practically occur no conversion, if no alkali is present, The cold swelling starch-alkali preparation may also be manufactured, by adding the alkali before or during the cold swelling starch process.

It will not be necessary, however, when dissolving cold swelling starches that only contain the etherifying and/or the esterifying agent, to add the alkali also in the form of a dry mixture of cold swelling starch and alkali, and it is also possible to dissolve the first mentioned starch preparation in water and to add the alkali as such, e. g. in the form of a more or less concentrated lye.

A dry product containing all constituents may also be manufactured by mixing the dry cold swelling starch preparation which has been produced in the presence of the etherification and/or esterification agent with the proportion of alkali, required for effecting the etherification and/or esterification, in the absence of a substantial amount of water. A dry product of this character can also be obtained by adding the alkali which is necessary or desired for the reaction prior to the cold swelling starch process or during the same and subsequently mixing the dry alkali-cold swelling starch preparation with the etherification and/or esterification agent.

The products according to the invention have considerable advantages since they may be delivered by the cold swelling starch manufacturer to the public in dry condition, so that it is made easy, even for the unskilled user, to have the benefit of the use of the starch ethers or esters described. The said advantages are due to the use of cold swelling starches for manufacturing the dry mixtures described above which do not yet contain ethers or esters, but from which the same are formed when the products are practically used. Cold swelling starches are much more reactive than e. g. native starch so that the reaction will occur at a substantially lower temperature and satisfactory results will be obtained with a smaller proportion of etherification and/or esterification agent. Moreover the cold swelling starches are soluble in cold water; the solutions obtained will produce the desired ethers or esters when moderately heated so that they can be prepared immediately before use in a very easy manner.

The cold swelling starch preparation according to the invention may contain any desired etherification or esterification agents or combinations of the same, provided the proportion and the character of the same are such that when the reaction is finished the products obtained are soluble in water. The proportion of etherification or esterification agent used may be varied and is dependent on the kind of agents used. Very good results may be obtained with a proportion of the agent which is insufficient for a complete etherification or esterification. As a rule monofunctional agents are used, but mixtures of mono-, bi- or polyfunctional or even bi- or polyfunctional agents alone may also be used, especially when they contain one or more hydrophilic groups, preferably ionogenic groups, such as carboxyl or sulphonic acid groups, in addition to the reactive functional groups, e. g. halogen, atoms, epoxy groups and the like. For manufacturing the soluble ethers and esters forming the subject matter of the invention only a limited proportion of the said bi- and polyfunctional agents should be used, whereas generally larger proportions of the monofunctional agents are allowable.

The solutions of the cold swelling starch preparations according to the present invention may be used for various purposes, e. g. as finishing of sizing agents, thickening agents for printing on paper and textile fabrics, as sizing agents for paper and as adhesives and binding agents for colours and all kinds of granular, fibrous and powdered materials. When the solutions are dried they will produce films the properties of which are generally similar to those obtained according to patent application No. 380,562.

The invention will be illustrated by the following examples.

Example I 500 grams of a cold swelling starch made from potato starch by the usual process, 58 g. of sodium monochlor-acetate and 80 g. of crystallized barium hydrate are intimately mixed.

The dry mixture may be stirred with 2–3 parts of cold water to form a viscous mass. By heating the said mass moderately for some time a solution of a starch ether is obtained which is ready for use.

Example II 1 kilogram of cold swelling potato starch is intimately mixed with 316 grams of sodium brom ethane sulphonate and 160 grams of anhydrous soda.

The dry product may be stirred with 2–4 parts of water to form a homogeneous viscous mass, which when heated will product the sodium starch ether sulphonate.

Example III

The process is carried out as described in example II; the sodium bromethane sulphonate is, however, added to the starch, before the latter is converted into cold swelling starch.

Example IV (a) 1 kg. of a cold swelling starch prepared from tapioca starch in the usual way is thoroughly mixed with 230 g. of diethyl sulphate.

(b) An alkali-starch paste obtained by adding 200 g. of a 30% caustic-soda solution to a suspension of 1 kg. of tapioca starch in 1 liter of water of between 40 and 50° C. is dried by the process usual for manufacturing cold swelling starch.

Equal quantities of (a) and (b) are mixed.

The mixture may be dissolved by stirring the same in 3 parts of water to form a viscous mass which will be converted after some time, preferably when moderately heated, into a starch ether in dissolved condition. The solution of the slightly ethylated starch product obtained in this way is a transparent viscous mass.

Example V 700 grams of sodium monochloroacetate are dissolved in 2 liters of water and in this solution there are suspended 2 kgs. of potato starch. This suspension is heated until gelatinization occurs and 50 grams of symmetric dichlordimethyl sulphate, diluted with 50 cm.³ of chloroform, are added. The mixture is dried in the manner usual for cold swelling starch.

500 g. of the dried product may be mixed while stirring with 2 liters of water, whereby a very viscous mass is obtained. After being intimately mixed with 180 g. of a 30% solution of caustic soda and preferably moderately heated, this mass will produce a solution of a mixed starch ether which may be adjusted to the desired viscosity by diluting the same with water.

We claim:

1. A starch product soluble in cold water, the solution of which when moderately heated will produce soluble starch derivatives of the group comprising starch ethers and starch esters consisting of a dry mixture of cold swelling starch, a reagent of the group comprising etherifying and esterifying agents and the proportion of alkaline substance necessary for effecting the reaction with the reagent in the solution.

2. A starch product soluble in cold water, the solution of which when moderately heated will produce soluble starch derivatives of the group comprising starch ethers and starch esters, consisting of a dry mixture of cold swelling starch, a reagent of the group comprising etherifying and esterifying agents and the proportion of alkaline substance necessary for effecting the reaction with the reagent in the solution, the cold swelling starch and the reagent being present in the form of a starch preparation having the reagent embedded therein, obtained by converting a mixture of starch and the reagent into a cold swelling starch.

3. A starch product soluble in cold water, the solution of which when moderately heated will produce soluble starch derivatives of the group comprising starch ethers and starch esters, consisting of a dry mixture of cold swelling starch, a reagent of the group comprising etherifying and esterifying agents and the proportion of alkaline substance necessary for effecting the reaction with the reagent in the solution, the cold swelling starch and the alkaline substance being present in the form of a starch preparation having the alkaline substance embedded therein, obtained by converting a mixture of starch and the alkaline substance into a cold swelling starch.

4. A starch product soluble in cold water, the solution of which when moderately heated in the presence of alkali will produce soluble starch derivatives of the group comprising starch ethers and starch esters, consisting of a dry mixture of cold swelling starch and a reagent of the group comprising etherifying and esterifying agents.

5. A starch product soluble in cold water, the solution of which when moderately heated in the presence of alkali will produce soluble starch derivatives of the group comprising starch ethers and starch esters, consisting of a dry mixture of cold swelling starch and a reagent of the group comprising etherifying and esterifying agents, the cold swelling starch and the reagent being present in the form of a starch preparation having the reagent embedded therein, obtained by converting a mixture of starch and the reagent into a cold swelling starch.

JAN LOLKEMA.
FREDRIK ANDRÉ MÖLLER.

REFERENCES CITED

The following references are of record in the file of this patent:

UNITED STATES PATENTS

| Number | Name | Date |
|---|---|---|
| 1,188,376 | Lilienfeld | June 20, 1916 |
| 1,350,820 | Lilienfeld | Aug. 24, 1920 |
| 1,504,178 | Young | Aug. 5, 1924 |

FOREIGN PATENTS

| Number | Country | Date |
|---|---|---|
| 881,496 | France | Apr. 27, 1943 |